(12) United States Patent
Shimizu et al.

(10) Patent No.: US 6,663,988 B2
(45) Date of Patent: Dec. 16, 2003

(54) MAGNETIC RECORDING MEDIUM, PRODUCTION PROCESS THEREOF, MAGNETIC RECORDING AND REPRODUCING APPARATUS, AND METHOD FOR EVALUATING INCLINATION DISTRIBUTION OF CRYSTAL PLANES ON THE MAGNETIC FILM SURFACE

(75) Inventors: Kenji Shimizu, Chiba (JP); Hiroshi Sakai, Chiba (JP)

(73) Assignee: Showa Denko Kabushiki Kaisha, Tokyo (JP)

(*) Notice: Subject to any disclaimer, the term of this patent is extended or adjusted under 35 U.S.C. 154(b) by 96 days.

(21) Appl. No.: 09/842,632

(22) Filed: Apr. 27, 2001

(65) Prior Publication Data

US 2002/0004148 A1 Jan. 10, 2002

Related U.S. Application Data

(60) Provisional application No. 60/230,703, filed on Sep. 7, 2000.

(30) Foreign Application Priority Data

Apr. 27, 2000 (JP) .................................. P2000-128305

(51) Int. Cl.$^7$ ................................................. G11B 5/66

(52) U.S. Cl. .............................. 428/694 T; 428/694 TS; 428/694 TM; 428/900; 427/128; 427/129; 427/130; 427/131

(58) Field of Search ...................... 428/694 T, 694 TS, 428/694 TM, 900; 427/128, 129, 130, 131

(56) References Cited

U.S. PATENT DOCUMENTS

| | | | | | |
|---|---|---|---|---|---|
| 6,068,739 | A | * | 5/2000 | Suzuki et al. | 204/192.2 |
| 6,346,181 | B1 | * | 2/2002 | Lee | 205/89 |
| 6,385,289 | B1 | * | 5/2002 | Kikuchi | 378/79 |
| 6,395,413 | B1 | * | 5/2002 | Ando | 428/694 T |

FOREIGN PATENT DOCUMENTS

JP     A 5-073877     3/1993

* cited by examiner

*Primary Examiner*—Leszek Kiliman
(74) *Attorney, Agent, or Firm*—Sughrue Mion, PLLC

(57) ABSTRACT

An object of the present invention is to provide a magnetic recording medium exhibiting excellent noise characteristics. On a substrate, an undercoat film is formed, and a perpendicular magnetic film, in which most of the easy-magnetization axes are oriented vertically with respect to the substrate, is formed on the undercoat film. A rocking curve 21 obtained through θ–2θ scanning employing X-ray diffraction in relation to the magnetic film has a plurality of local maximum points 22 and 23.

6 Claims, 6 Drawing Sheets

MAGNETIC RECORDING MEDIUM, PRODUCTION PROCESS THEREOF, MAGNETIC RECORDING AND REPRODUCING APPARATUS, AND METHOD FOR EVALUATING INCLINATION DISTRIBUTION OF CRYSTAL PLANES ON THE MAGNETIC FILM SURFACE

CROSS REFERENCE TO RELATED APPLICATIONS

This application is an application filed under 35 U.S.C. §111(a) claiming benefit pursuant to 35 U.S.C. §119(e)(1) of the filing date of Provisional Application No. 60/230,703 filed Sep. 7, 2000 pursuant to 35 U.S.C. §111(b).

FIELD OF THE INVENTION

The present invention relates to a magnetic recording medium employed in an apparatus such as a magnetic disk apparatus; a process for producing the magnetic recording medium; a magnetic recording and reproducing apparatus comprising the magnetic recording medium; and a method for evaluating a profile in relation to inclination of crystal planes on a magnetic film surface.

BACKGROUND OF THE INVENTION

A conventional, widely employed magnetic recording medium is of a longitudinal recording type in which most of the easy-magnetization axes in the magnetic film are oriented horizontally with respect to the substrate. The term magnetic anisotropy is used to describe the dependence of internal energy on the direction of spontaneous magnetization, and the stable direction of spontaneous magnetization is called "easy-magnetization axis". In the case of longitudinal type, the term "most" used herein describes the state of longitudinal orientation when the coercive force in the in-plane direction is higher than the coercive force of the vertical direction when the coercive force of the magnetic recording medium is measured.

In such a longitudinal magnetic recording medium, when recording density is increased, per-bit volume becomes exceedingly small and reproduction characteristics may deteriorate due to thermal instability. In addition, when recording density is increased, the effect of a diamagnetic field at a recording bit boundary may cause an increase in medium noise.

In contrast, in a perpendicular magnetic recording medium in which most of the easy-magnetization axes in the magnetic film are oriented vertically with respect to the substrate, the effect of a diamagnetic field at a recording bit boundary is minimal even when recording density is increased, and recording magnetic domains having clear boundaries are formed. In the case of perpendicular type, the term "most" used herein describes the state of vertical orientation when the coercive force in the vertical direction is higher than the coercive force of the in-plane direction when the coercive force of the magnetic recording medium is measured. As a result, noise can be reduced. In addition, even when bit volume is relatively large, recording density can be increased, and thus resistance to thermal decay is high. Therefore, a perpendicular magnetic recording medium has recently become of interest, and magnetic recording medium structures suitable for perpendicular magnetic recording have been proposed.

In recent years, there has been a demand for magnetic recording media of higher recording density, and in accordance with this trend, further improvements to noise characteristics have been required.

In view of the foregoing, an object of the present invention is to provide a magnetic recording medium exhibiting excellent noise characteristics, and a process for producing the magnetic recording medium effectively.

The present inventors have found that when a rocking curve in relation to a perpendicular magnetic film has a plurality of local maximum points, noise characteristics can be enhanced. The present invention has been accomplished on the basis of this finding.

SUMMARY OF THE INVENTION

In order to solve the aforementioned problems, the present invention provides a magnetic recording medium comprising a substrate; an undercoat film formed thereon; and a perpendicular magnetic film in which most of the easy-magnetization axes are oriented vertically with respect to the substrate, the magnetic film being formed on the undercoat film, wherein a rocking curve in relation to the magnetic film has a plurality of local maximum points, the curve being obtained through $\theta$–$2\theta$ scanning employing X-ray diffraction.

When the magnetic recording medium is subjected to magnetization, the magnetization direction is not a specific direction and varies to some extent, since there are a plurality of local maximum points in the orientation direction of crystals in the perpendicular magnetic film.

Therefore, at the boundary between two adjacent recording magnetic domains, the magnetization direction of one magnetic domain is not completely opposite that of the other magnetic domain, but slightly deviates from the opposite direction. Thus, compared with when the magnetization directions are completely opposite to each other, magnetic fluctuations, which would otherwise stem from magnetic interaction between the magnetic domains, may be absent in the vicinity of the magnetic domain wall.

As a result, generation of noise attributed to magnetic fluctuations can be prevented, and noise characteristics can be enhanced.

In order to enhance noise characteristics, the difference between an incident angle of an incident X-ray beam the incident X-ray beam being employed when the rocking curve is obtained corresponding to either of the local maximum points and an incident angle corresponding to the peak of a diffracted X-ray beam of a dominant crystal plane in the surface of perpendicular magnetic film, is preferably 3–10° in the rocking curve.

The half width of a peak portion of the rocking curve is preferably 10–30°.

Preferably, the perpendicular magnetic film comprises any alloy selected from among a Co/Cr alloy, a Co/Cr/Pt alloy, a Co/Cr/Ta alloy, and a Co/Cr/Pt/X (X: one or more species of Ta, Zr, Cu, Re, Nb, Si, Ge, and B) alloy.

The present invention also provides a process for producing a magnetic recording medium, which comprises forming an undercoat film on a substrate, and forming, on the undercoat film, a perpendicular magnetic film in which most of the easy-magnetization axes are oriented vertically with respect to the substrate, so that a rocking curve obtained through $\theta$–$2\theta$ scanning employing X-ray diffraction has a plurality of local maximum points.

The present invention also provides a magnetic recording and reproducing apparatus comprising the aforementioned magnetic recording medium, and a magnetic head for recording data onto the medium and reproducing the data therefrom.

The present invention also provides a method for evaluating a profile in relation to inclination of crystal planes in a magnetic film surface, which method comprises: (1) a peak determination step for determining the peak intensity of a diffracted X-ray beam through θ–2θ scanning; (2) a step for determining a rocking curve; and (3) a step for determining the number of local maximum points in the resultant rocking curve. In the peak determination step, when a disk including a perpendicular magnetic film on the outermost surface of the disk is irradiated with an incident X-ray beam and the diffracted X-ray beam is detected by a diffracted-X-ray detector, the position of the detector is determined such that the angle of the diffracted X-ray beam with respect to the incident X-ray beam is twice the incident angle of the incident X-ray beam with respect to a disk plane, the incident angle of the incident X-ray beam is varied by varying the direction of the disk during irradiation of the incident X-ray beam, while, simultaneously, varying the position of the detector so that the angle of the diffracted X-ray beam with respect to the incident X-ray beam is maintained to be twice the incident angle of the incident X-ray beam. The intensity of the diffracted X-ray beam is measured by the detector through θ–2θ scanning to determine the position of the detector so that the intensity of the diffracted X-ray beam reaches its maximum. Further, in the rocking curve determination step, the detector is fixed at the position determined in the peak determination step, and then the incident angle of the incident X-ray beam is varied by varying the direction of the disk to determine a rocking curve showing the relation between the incident angle and the intensity of the diffracted X-ray beam detected by the detector. In the step for determining the number of local maximum points, the number of local maximum points is counted on the basis of the shape of the rocking curve; and a profile in relation to inclination of crystal planes in the perpendicular magnetic film surface with respect to the disk plane is evaluated on the basis of the shape of the rocking curve and the number of the local maximum points, which are obtained through steps (1) through (3).

When the rocking curve does not seem to have a plurality of local maximum points because of overlapping of local maximum portions of the curve, a profile in relation to inclination of crystal planes in the perpendicular magnetic film surface with respect to the disk plane may be evaluated through the following steps. After steps (1) to (3), the rocking curve is separated into two separation curves through (A), an initial peak value determination step for providing an initial peak value of a separation curve; (B), an initial half-width determination step for providing an initial half-width of a separation curve; and (C), a separation curve preparation step for preparing a separation curve through operation processing by use of the determined initial peak value and initial half-width. In the initial peak value determination step, an initial peak value of each separation curve is determined on the assumption that the difference between an incident angle corresponding to the peak of a first separation curve and an incident angle corresponding to the peak of the diffracted X-ray beam of a dominant crystal plane in the perpendicular magnetic film surface is equal to that between an incident angle corresponding to the peak of a second separation curve and the incident angle corresponding to the peak of the diffracted X-ray beam of the dominant crystal plane in the perpendicular magnetic film surface. In the initial half-width determination step, an initial half-width is determined from twice the difference between the incident angle corresponding to the peak of either separation curve and the incident angle corresponding to the position representing ½ of the intensity of an X-ray beam of the rocking curve at the initial peak value. A profile in relation to inclination of crystal planes in the perpendicular magnetic film surface with respect to the disk plane is evaluated on the basis of the shape of the separation curve obtained through steps (A) through (C).

DESCRIPTION OF THE PRESENT INVENTION

The present invention will be described in detail with reference to the Figures. The present invention is not intended to be limited by such embodiments, which should not be construed as limiting the scope of the present invention.

Figure 1:
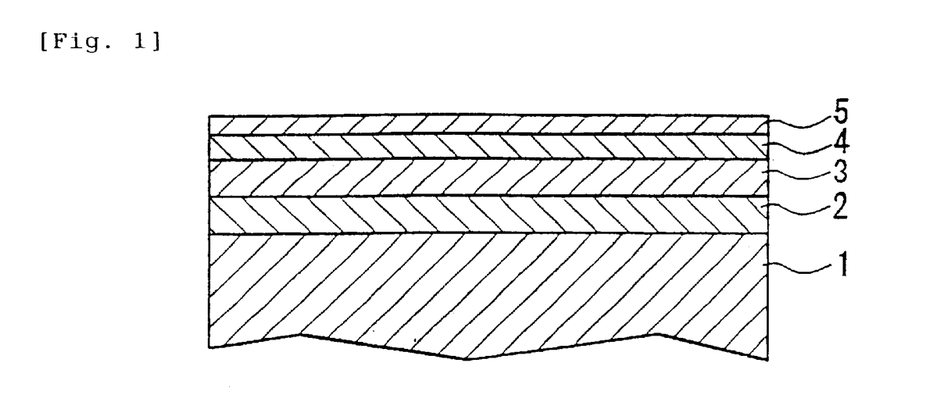
FIG. 1 is a partially cross-sectional view of one embodiment of the magnetic recording medium of the present invention.

FIG. 1 is a schematic representation showing an example embodiment of the magnetic recording medium of the present invention. The magnetic recording medium includes a non-magnetic substrate 1, an undercoat film 2, a non-magnetic intermediate film 3, a perpendicular magnetic film 4, and a protective film 5, the films 2 to 5 being successively formed on the substrate 1.

The non-magnetic substrate 1 may be an aluminum alloy substrate on which an NiP plating film is formed, which is generally employed as a substrate for magnetic recording media; or a substrate of glass, ceramic, carbon, or flexible resin, which substrate may be coated with an NiP film through plating or sputtering.

In order to improve read-write conversion characteristics and enhance coercive force, the surface of the substrate 1 may be subjected to texturing. Particularly, in the case in which the undercoat film 2 is formed from a soft magnetic material (e.g., a CoZrNb alloy), when the surface of the substrate 1 is subjected to texturing in a circumferential direction of the substrate, spike noise can be reduced, which is preferable.

The undercoat film 2 is provided for increasing coercive force, suppressing medium noise, enhancing read-signal output, and improving noise characteristics of the magnetic recording medium.

The material of the undercoat film 2 may be a non-magnetic material or a magnetic material.

Examples of the material of the undercoat film 2 include a variety of soft magnetic materials such as a CoZrNb alloy, a CoTaNb alloy, and a CoZrMo alloy; Ru; Ge; and C.

The thickness of the undercoat film 2 is preferably greater than 0 Å but equal to or less than 5,000 Å. When the thickness is in excess of the above range, noise increases and noise characteristics deteriorate. When Ru, Ge, C, or the like is employed as the material of the undercoat film 2, the thickness of the film 2 is preferably 1–100 nm (10–1,000 Å), from the viewpoint of noise characteristics. When a soft magnetic material is employed as the material of the undercoat film 2, the thickness of the film 2 is preferably 1,000–3,000 Å, more preferably 2,000–2,500 Å, from the viewpoint of noise characteristics.

The non-magnetic intermediate film 3 is provided to increase the coercive force of the medium, and is preferably formed from a non-magnetic material of hcp or fcc structure.

The material of the non-magnetic intermediate film 3 is preferably any alloy selected from among Co/Cr, Co/Cr/Pt, Co/Cr/Ta, and Co/Cr/Pt/X (X: one or more species of Ta, Zr, Cu, Re, Nb, Si, Ge, and B).

More preferably, the material of the non-magnetic intermediate film 3 includes, as a primary component, a Co alloy containing Cr: 25–50 at %, Pt: 0–15 at %, X: 0–10 at %, and Co: the balance.

The non-magnetic intermediate film 3 may have either a single-layer structure or a multi-layer structure. In the case of a multi-layer structure, the film 3 may be formed of a plurality of layers containing a single material or different materials selected from the aforementioned materials.

The thickness of the non-magnetic intermediate film 3 is preferably 50 nm (i.e., 500 Å) or less. When the thickness is in excess of the above range, magnetic grains in the perpendicular magnetic film 4 tend to become large, and noise characteristics deteriorate, which is unsatisfactory.

The thickness of the non-magnetic intermediate film 3 is more preferably 10–30 nm (100–300 Å).

The perpendicular magnetic film 4 is formed from a magnetic material in which most of the easy-magnetization axes are oriented vertically with respect to the substrate. The film 4 is preferably formed from any alloy selected from among Co/Cr, Co/Cr/Pt, Co/Cr/Ta, and Co/Cr/Pt/X (X: one or more species of Ta, Zr, Cu, Re, Nb, Si, Ge, and B).

More preferably, the film 4 is formed from a Co alloy containing Cr: 13–25 at %, Pt: 0–15 at %, X: 0–5 at %, and Co: the balance. When the amount of any component falls outside the respective range, noise characteristics may deteriorate or read-signal output may lower.

The thickness of the perpendicular magnetic film 4 is preferably 10–100 nm (100–1,000 Å). When the thickness of the perpendicular magnetic film 4 is below the above range, magnetic flux arises to an unacceptable level, and thus read-signal output is reduced. In contrast, when the thickness of the perpendicular magnetic film 4 is in excess of the above range, magnetic grains in the film 4 tend to become large, and thus noise characteristics may deteriorate.

More preferably, the thickness of the perpendicular magnetic film 4 is 30–70 nm (300–700 Å). This is because, when the thickness of the perpendicular magnetic film 4 falls within this range, read-signal output can be further enhanced and formation of large magnetic grains in the film 4 can be prevented, thereby further improving noise characteristics.

The perpendicular magnetic film 4 may be a multi-layer film including a plurality of layers formed from the aforementioned material (e.g., a Co/Cr alloy, a Co/Cr/Pt alloy, a Co/Cr/Ta alloy, or a Co/Cr/Pt/X alloy). An intermediate layer may be formed between the layers, and the intermediate layer may be formed from the material of the undercoat film 2 as described above.

In this embodiment, a rocking curve in relation to the perpendicular magnetic film 4, which is obtained through θ–2θ scanning employing X-ray diffraction, has two local maximum points. The rocking curve will be described below.

The protective film 5 is provided for preventing corrosion of the perpendicular magnetic film 4 and for protecting the surface of the medium from any damage. Conventionally known materials may be employed for forming the film 5. Examples of such materials include a single composition of C, $SiO_2$, or $ZrO_2$; and a composition containing C, $SiO_2$, or $ZrO_2$ as a primary component and other elements.

The thickness of the protective film 5 is preferably 1–20 nm (i.e., 10–200 Å), from the viewpoints of corrosion resistance and tribology. In order to reduce spacing loss and to obtain satisfactory read-signal output, the thickness of the film 5 is more preferably 1–10 nm (10–100 Å).

On the protective film 5, a lubrication film formed from perfluoropolyether, fluorinated alcohol, or fluorinated carboxylic acid is preferably provided.

With reference to FIGS. 2 through 5, an embodiment of the method for evaluating a profile in relation to inclination of crystal planes on the surface of a magnetic film of the present invention will next be described by taking an evaluation of the profile in relation to inclination of crystal planes in the surface of the perpendicular magnetic film 4 as an example, and the rocking curve will also be described in detail.

In the evaluation method of the embodiment, the profile in relation to inclination of crystal planes on the surface of the perpendicular magnetic film 4 is evaluated through the following three steps:

(1) a peak determination step for determining the peak intensity of a diffracted X-ray beam through θ–2θ scanning;

(2) a step for determining a rocking curve; and (3) a step for determining the number of local maximum points in the resultant rocking curve.

Each step will next be described in detail.

Figure 2:
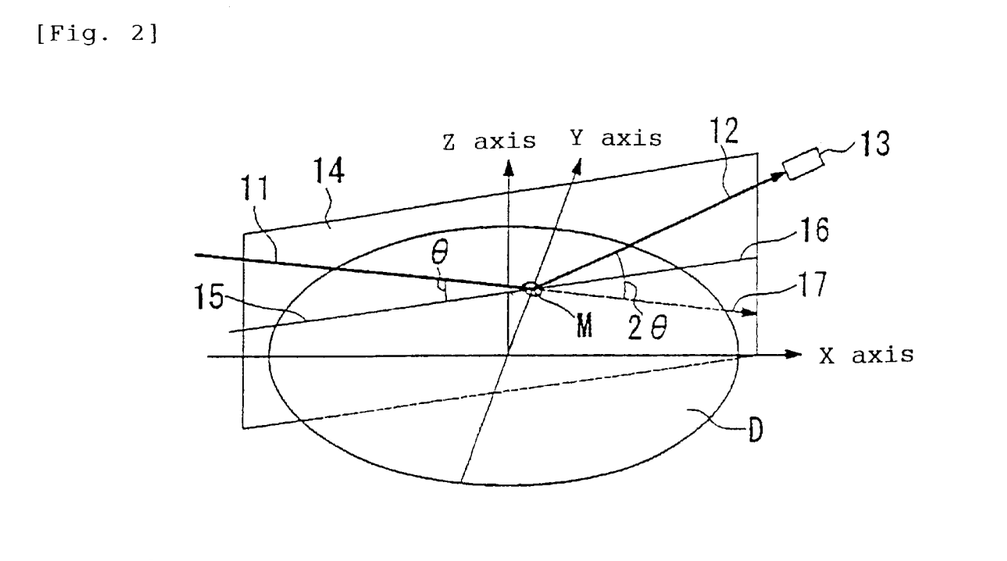
FIG. 2 is a schematic representation showing the procedure for preparation of a rocking curve through θ–2θ scanning employing X-ray diffraction.

(1) Determination of the peak intensity of a diffracted X-ray beam through θ–2θ scanning As shown in FIG. 2, the X axis and Y axis are determined along the surface of a disk D whose outermost surface is the perpendicular magnetic film 4, and the Z axis is determined to be perpendicular to the X and Y axes. An irradiation point M on the surface of the disk D is irradiated with an X-ray beam (an incident X-ray beam 11) from a non-illustrated irradiation source, and a diffracted X-ray beam 12 is detected by a diffracted-X-ray detector 13.

The position of the detector 13 is determined so that the angle of the diffracted X-ray beam 12, which is detected by the detector 13, with respect to the incident X-ray beam 11 (i.e., the angle of the diffracted X-ray beam 12 with respect to an extension line 17 of the incident X-ray beam 11) becomes twice the incident angle θ of the incident X-ray beam 11 with respect to the surface of the disk D; i.e., 2θ.

In FIG. 2, reference numeral 14 represents a plane which is parallel to the Z axis and which includes the measurement point M, the incident X-ray beam, and the diffracted X-ray beam; reference numeral 15 represents a projection line formed through projection of the incident X-ray beam 11 onto an X-Y plane; and reference numeral 16 represents a projection line formed through projection of the diffracted X-ray beam 12 onto the X-Y plane.

Figure 3:
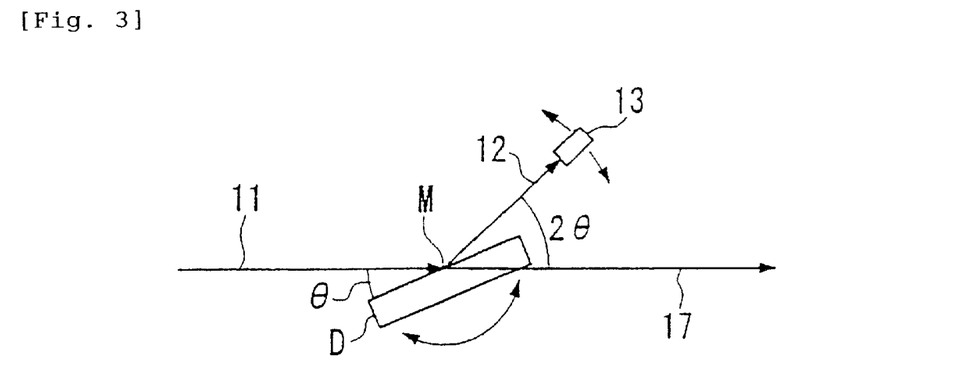
FIG. 3 is another schematic representation showing the procedure for preparation of a rocking curve through θ–2θ scanning employing X-ray diffraction.

As shown in FIG. 3, during irradiation of the incident X-ray beam 11, the incident angle $\theta$ of the incident X-ray beam 11 is varied by varying the direction of the disk D, and simultaneously varying the position of the detector 13 so that the angle of the diffracted X-ray beam 12 with respect to the incident X-ray beam 11 (the extension line 17) is maintained to be $2\theta$ (i.e., twice the incident angle $\theta$ of the incident X-ray beam 11). The intensity of the diffracted X-ray beam 12 is measured by the detector 13 through $\theta$–$2\theta$ scanning to investigate the relation between $\theta$ and the intensity of the diffracted X-ray beam 12 and to determine the position of the detector 13 so that the intensity of the diffracted X-ray beam 12 reaches its maximum. At the position of the detector 13, the angle $2\theta$ of the diffracted X-ray beam 12 with respect to the incident X-ray beam 11 (the extension line 17) is referred to as "$2\theta p$."

When the direction of the disk D is varied during $\theta$–$2\theta$ scanning, a rotation axis (not shown in the figure), which is perpendicular to the projection lines 15 and 16 corresponding to the incident X-ray beam 11 and the diffracted X-ray beam 12 and lying in the X-Y plane, is determined, and the disk D is rotated about the rotation axis. Hereinafter, the above step will be referred to as a "peak determination step."

A dominant crystal plane in the surface of the perpendicular magnetic film 4 can be derived from the above-obtained $2\theta p$. For example, in the case in which Co—22 at % Cr—10 at % Pt-2 at % Ta (Co22Cr10Pt2Ta) is employed as a material of the perpendicular magnetic film 4, when $2\theta p$ is about 43.4° (i.e., $\theta p$ is about 21.7°), a dominant crystal plane in the surface of the perpendicular magnetic film 4 is found to be a (0002) plane.

(2) Determination of a rocking curve

Figure 4:
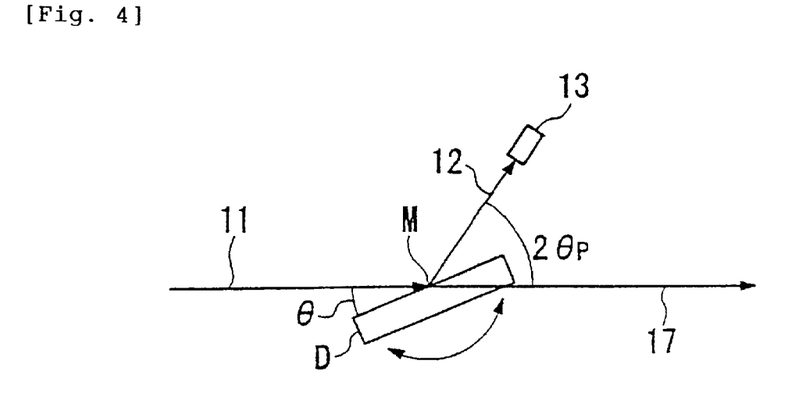
FIG. 4 is still another schematic representation showing the procedure for preparation of a rocking curve through θ–2θ scanning employing X-ray diffraction.

Subsequently, as shown in FIG. 4, the detector 13 is fixed at a position where the angle $2\theta$ of the diffracted X-ray beam 12 is $2\theta p$.

Subsequently, while the detector 13 is fixed at such position, the incident angle $\theta$ of the incident X-ray beam 11 is varied by varying only the direction of the disk D to obtain a rocking curve showing the relation between the incident angle $\theta$ and the intensity of the diffracted X-ray beam 12 detected by the detector 13.

Hereinafter, the above step will be referred to as a "rocking curve determination step."

Since the detector 13 is fixed at the position where the angle $2\theta$ of the diffracted X-ray beam 12 is $2\theta p$, the rocking curve shows a profile in relation to the inclination of crystal planes on the surface of the perpendicular magnetic film 4 with respect to the surface of the disk D.

(3) Determination of the number of local maximum points on a rocking curve

Subsequently, the number of local maximum points on the above-obtained rocking curve is determined. In order to determine the number of local maximum points on the rocking curve, the local maximum points are counted on the basis of the shape of the rocking curve.

When the measured data possess a high noise level and determination of the number of local maximum points on the basis of the data is difficult, an approximate curve is formed by smoothing the measured data, and the number of local maximum points may be determined on the basis of the approximate curve.

Such an approximate curve may be formed by means of a weighted mean smoothing method.

Whether or not the differential value of the approximate curve becomes zero may be a criterion for determination of local maximum points.

Figure 5:
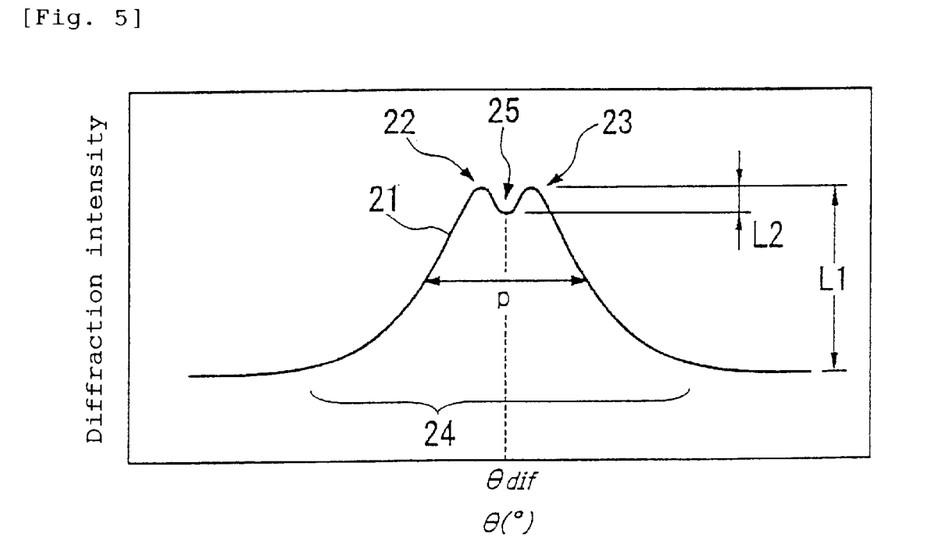
FIG. 5 is a graph showing an example of a rocking curve.

FIG. 5 shows an example of a rocking curve.

A rocking curve 21 shown in FIG. 5 has a peak portion 24 including two local maximum points 22 and 23. This rocking curve shows that there are two local maximum points in an orientation direction of crystals in the perpendicular magnetic film 4.

For example, when a dominant crystal plane in the surface of the perpendicular magnetic film 4 is a (0002) plane, incident angles $\theta$ corresponding to the local maximum points 22 and 23 are preferably not identical to an incident angle $\theta dif$ corresponding to the peak of a diffracted X-ray beam of the (0002) plane. Also, one of the angles $\theta$ is larger than the angle $\theta dif$ and the other is smaller than the angle $\theta dif$. Preferably, the incident angles $\theta$ corresponding to the local maximum points 22 and 23 are almost symmetrical with respect to the incident angle $\theta dif$.

The difference between the incident angle $\theta$ corresponding to the local maximum point 22 or 23 and the incident angle $\theta dif$ (i.e., the absolute value of ($\theta - \theta dif$)) is 3–10°, preferably 5–10°.

When the difference is below the above range, the magnetic film may fail to exert the effect of enhancing noise characteristics, whereas when the difference is in excess of the above range, orientation in a vertical direction of the magnetic film becomes unsatisfactory, and noise characteristics are impaired, particularly when recording density is increased, which is not preferable.

Preferably, the ratio of the distance between the local maximum point 22 or 23 and a local minimum point 25 located between the points 22 and 23 (i.e., a length L2) to a height L1 of the peak portion 24; i.e., L2/L1, is 0.1 or more, preferably 0.2 or more.

When the ratio L2/L1 is below the above range, the magnetic film may fail to exert the effect of enhancing noise characteristics.

The half-width of the peak portion 24 of the rocking curve 21 (i.e., the width of the peak portion 24 at a height of L1/2); i.e., a half-width p shown in FIG. 5, is 10–30°, preferably 10–20°, more preferably 10–15°.

When the half-width p is below the above range, the magnetic film may fail to exert the effect of enhancing noise characteristics, whereas when the half-width is in excess of the above range, orientation in a vertical direction of the magnetic film becomes unsatisfactory, and noise characteristics are impaired, particularly when recording density is increased, which is not preferable.

In the evaluation method of the embodiment, a profile in relation to inclination of crystal planes in the surface of the perpendicular magnetic film 4 is evaluated on the basis of the number of the local maximum points and the shape of the rocking curve obtained through the above steps (1) through (3).

For example, as is apparent from FIG. 5, since the rocking curve 21 has the two local maximum points 22 and 23, there are two local maximum points (deflection portions) in an orientation direction of crystals (inclination of crystal planes) in the perpendicular magnetic film 4.

When the difference between the incident angle $\theta$ corresponding to the local maximum point 22 or 23 and the incident angle $\theta dif$ is large, a crystal orientation direction at the local maximum point is greatly deviated from a vertical direction (with respect to the surface of the disk D), whereas when the difference between the incident angles $\theta$ and $\theta dif$ is small, a crystal orientation direction at the local maximum point is close to the vertical direction.

In order to produce the magnetic recording medium including the aforementioned structure, firstly, the undercoat film 2, the non-magnetic intermediate film 3, and the perpendicular magnetic film 4 are successively formed on the substrate 1 by means of a technique such as sputtering, vacuum deposition, or ion-plating. Subsequently, the protective film 5 is formed on the film 4 by means of plasma CVD, an ion-beam method, sputtering, or a similar technique.

When the perpendicular magnetic film 4 is formed, film formation conditions are determined so that a rocking curve obtained through the aforementioned steps (i.e., (1) determination of the peak intensity of a diffracted X-ray beam through $\theta$–$2\theta$ scanning, and (2) determination of a rocking curve) has a plurality of local maximum points.

For example, when the perpendicular magnetic film 4 is formed through sputtering, film formation conditions affecting a rocking curve include the material of a sputtering target; the pressure in a chamber; the temperature during film formation; and the type of a sputtering gas.

When a lubrication film is formed, a customary method such as dipping or spin coating may be employed.

The magnetic recording medium of the embodiment exhibits excellent noise characteristics, since the rocking curve obtained by means of a rocking curve method in relation to the perpendicular magnetic film 4 has two local maximum points. The reason for the above will be described by taking the case in which the rocking curve 21 has the two local maximum points 22 and 23 as shown in FIG. 5 as an example.

When the rocking curve 21 has the two local maximum points 22 and 23, noise characteristics of the medium are enhanced. The reason is thought to be as follows.

In the magnetic recording medium, since the rocking curve 21 has the two local maximum points 22 and 23, there are two local maximum points (deflection portions) in an orientation direction of crystals in the perpendicular magnetic film 4.

In general, in a perpendicular magnetic recording medium, the effect of a diamagnetic field at a recording bit boundary is low, and recording magnetic domains having relatively clear boundaries are formed compared with a longitudinal magnetic recording medium.

However, at the boundary between two adjacent recording magnetic domains, the magnetization direction of one magnetic domain is completely opposite that of the other magnetic domain, and thus suppression of magnetic fluctuation, which is affected by magnetization in the opposite directions in the vicinity of the magnetic domain wall, is difficult.

In contrast, when the magnetic recording medium of the embodiment is subjected to magnetization, the magnetization direction is not a specific direction and varies to some extent, since there are two local maximum points in an orientation direction of crystals in the perpendicular magnetic film 4.

Therefore, at the boundary between two adjacent recording magnetic domains, the magnetization direction of one magnetic domain is not completely opposite that of the other magnetic domain, but is slightly deviated from the opposite direction. Thus, magnetic fluctuation, which would otherwise arise because of magnetic interaction between the magnetic domains, may be absent in the vicinity of the magnetic domain wall compared with when the magnetization directions are completely opposite.

As a result, generation of noise attributed to magnetic fluctuation can be prevented, and noise characteristics can be enhanced.

According to the production process for a magnetic recording medium of the present invention, a magnetic recording medium exhibiting excellent noise characteristics can be easily produced, since the perpendicular magnetic film 4 is formed so that a rocking curve obtained through $\theta$–$2\theta$ scanning employing X-ray diffraction has a plurality of local maximum points.

According to the method for evaluating a profile in relation to the inclination of crystal planes in the surface of a magnetic film, a profile in relation to the inclination of crystal planes in the surface of the perpendicular film 4 can be easily evaluated, since a rocking curve is obtained through the following steps: (1) a peak determination step for determining the peak intensity of a diffracted X-ray beam through $\theta$–$2\theta$ scanning; and (2) a rocking curve determination step.

Figure 6:
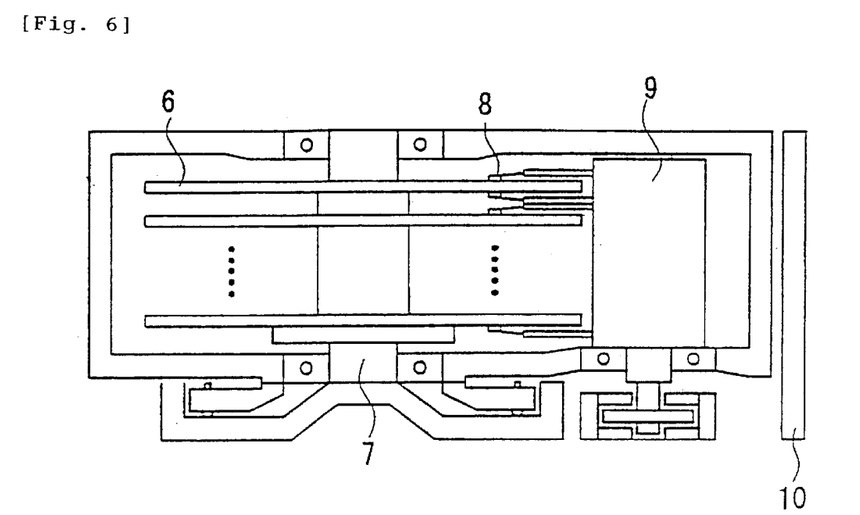
FIG. 6 is a partially cross-sectional view of one embodiment of the magnetic recording and reproducing apparatus of the present invention.

FIG. 6 shows an embodiment of the magnetic recording and reproducing apparatus including the magnetic recording medium. The apparatus includes a magnetic recording medium 6 (the structure of the medium being shown in FIG. 1); a medium-driving portion 7 which rotates the medium 6; a magnetic head 8 which is employed for recording of data onto the medium 6 and for reproduction of the data from the medium 6; a head-driving portion 9; and a recorded/reproduced signal-processing system 10. In the system 10, incoming external signals are processed and sent to the magnetic head 8, or reproduction signals from the head 8 are processed and sent to the outside.

When the magnetic recording and reproducing apparatus is employed, recording density can be increased, since noise characteristics of the magnetic recording medium can be enhanced.

In the magnetic recording medium of the embodiment, the rocking curve 21 has the two local maximum points 22 and 23. However, the number of the local maximum points is not limited to two, but may be an arbitrary number of two or more.

Figure 7:
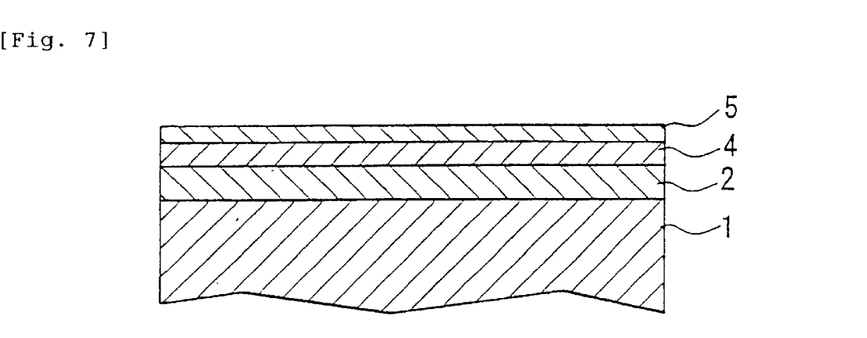
FIG. 7 is a partially cross-sectional view of another embodiment of the magnetic recording medium of the present invention.

The magnetic recording medium having the aforementioned structure includes the non-magnetic intermediate film 3 formed from a material of hcp structure. However, the magnetic recording medium of the present invention is not particularly limited to the aforementioned embodiment, and the non-magnetic intermediate film 3 may be omitted. The magnetic recording medium not including the non-magnetic intermediate film 3 is shown in FIG. 7.

In the present invention, in addition to the undercoat film 2 having the aforementioned structure, a second undercoat film may be provided directly above or below the undercoat film 2. The second undercoat film is preferably provided directly above the undercoat film 2.

Figure 8:
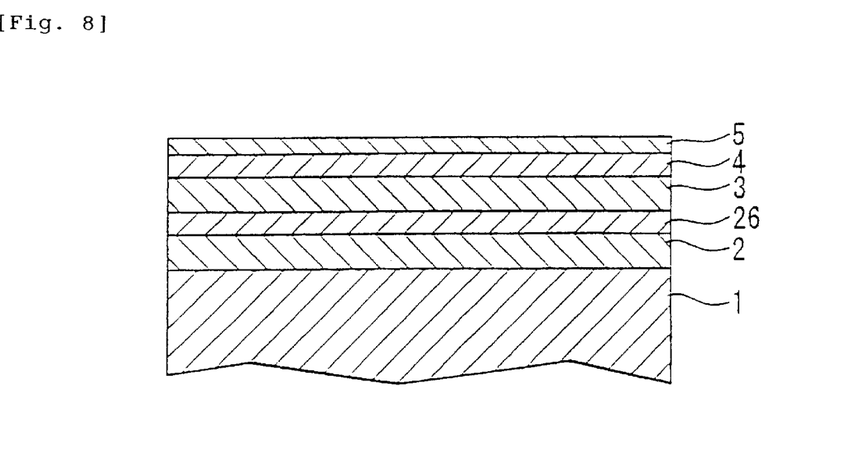
FIG. 8 is a partially cross-sectional view of still another embodiment of the magnetic recording medium of the present invention.

FIG. 8 shows an example of a magnetic recording medium including a second undercoat film. The magnetic recording medium shown in FIG. 8 differs from the magnetic recording medium shown in FIG. 1 in that a second undercoat film 26 is formed on an undercoat film 2 (i.e., between the undercoat film 2 and a non-magnetic intermediate film 3).

The second undercoat film 26 may be formed from the aforementioned material of the undercoat film 2. The magnetic recording medium may include three or more undercoat films.

As used herein, the term "primary component" refers to a component which is contained in an amount of more than 50 at %.

In the case in which a rocking curve has substantially a plurality of local maximum portions, the rocking curve seems not to have a plurality of local maximum points when the portions overlap one another. Particularly, high noise may lead to difficulty in determination of local maximum points.

In such a case, the rocking curve is separated into a plurality of curves, and the peaks of the resultant curves are employed in a manner similar to the case of the aforementioned local maximum points. On the basis of the number of the peaks and the shape of the curves, a profile in relation to the inclination of crystal planes in the surface of a magnetic film can be evaluated.

Figure 9:
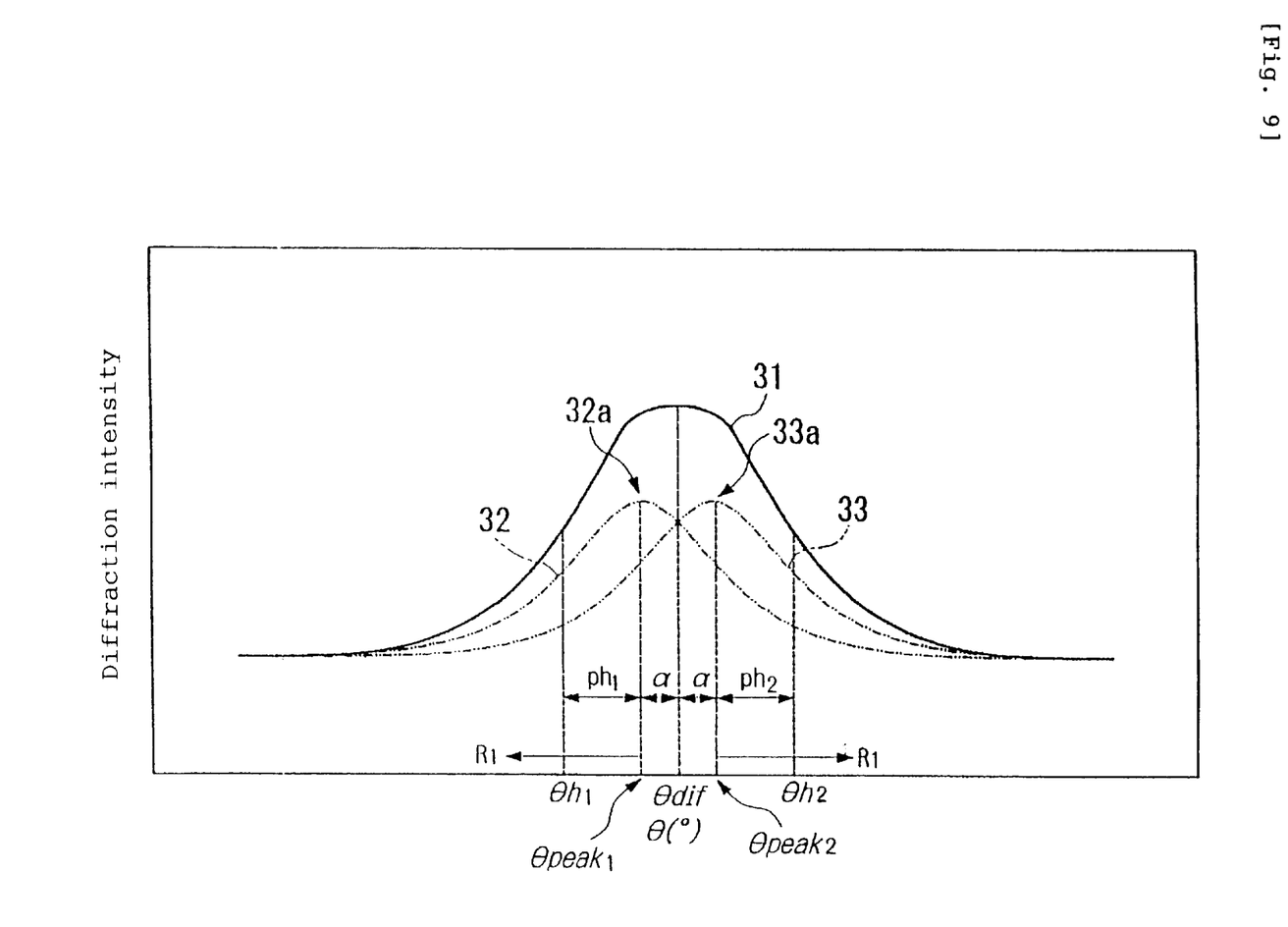
FIG. 9 is a graph showing another example of a rocking curve.

The method for evaluating a profile in relation to the inclination of crystal planes in the surface of a magnetic film will next be described by taking the case in which a rocking curve 31 obtained in relation to the perpendicular magnetic film 4 seems not to have a plurality of local maximum points, as shown in FIG. 9 as an example.

In the evaluation method, the rocking curve 31 is separated into two separation curves 32 and 33 through the below-described three steps (A) to (C) performed in succession after the aforementioned three steps (1) to (3).

When the measured data have high noise and determination of the number of local maximum points on the basis of the data is difficult, an approximate curve may be formed by smoothing the measured data by means of a weighted mean smoothing method to employ the curve as the rocking curve 31.

(A) Determination of initial peak value of separation curve (initial peak value determination step)

In this step, an initial peak value of each of the separation curves 32 and 33 is determined on the assumption that a difference $\alpha$ between an incident angle $\theta$peak1 corresponding to the peak 32$a$ of the separation curve 32 and an incident angle $\theta$dif corresponding to the peak of the diffracted X-ray beam of a dominant crystal plane on the surface of the perpendicular magnetic film 4 is equal to a difference $\alpha$ between an incident angle $\theta$peak2 corresponding to the peak 33$a$ of the separation curve 33 and the incident angle $\theta$dif corresponding to the peak of the diffracted X-ray beam of the dominant crystal plane on the surface of the perpendicular magnetic film 4; i.e., the incident angles $\theta$peak1 and $\theta$peak2 are $\theta$dif$\pm\alpha$. The difference $\alpha$ is preferably set at 3–10°.

For example, when the dominant plane in the surface of the perpendicular magnetic film 4 is a (0002) plane and the incident angle $\theta$dif corresponding to the peak of the diffracted X-ray beam of the (0002) plane is 21.7°, the incident angles $\theta$ corresponding to the peaks of the separation curve 32 and 33 may be 21.7±(3–10).

The difference $\alpha$ is set at 3–10°. This is because, when a local maximum point falls within this range, noise characteristics are enhanced, and operation processing for preparing a separation curve is easily carried out.

When the position of a local maximum point can be determined, the position can be regarded as an initial peak value. For example, when the rocking curve has a portion where the differential value becomes nearly zero (e.g., a shoulder-like portion) compared with the differential value at an adjacent portion, the position of the shoulder-like portion can be regarded as an initial peak value.

(B) Determination of initial half-width of separation curve (initial half-width determination step)

On the assumption that the separation curves 32 and 33, in which the initial values of the peaks 32$a$ and 33$a$ are determined in step (A), are of Gaussian type, the initial half-widths of the respective separation curves are determined. The initial half-width of the separation curve 32 is twice the difference ph1 between the incident angle $\theta$peak1 corresponding to the peak 32$a$ and an incident angle $\theta$h1 corresponding to a position on the rocking curve 31 within a region R1 which includes $\theta$peak1 corresponding to the peak 32$a$ and is away from the incident angle $\theta$dif where the X-ray intensity is ½ that of the initial peak of the rocking curve 31. The initial half-width of the separation curve 33 is twice the difference ph2 between the incident angle $\theta$peak2 corresponding to the peak 33$a$ and an incident angle $\theta$h2 corresponding to the position on the rocking curve 31 within a region R1 which includes $\theta$peak2 corresponding to the peak 33$a$ and is away from the incident angle $\theta$dif where the X-ray intensity is ½ that at the initial peak of the rocking curve 31. The method for determining the initial half-width is not limited to that described above.

(C) Preparation of separation curve through operation processing making use of the determined initial peak value and initial half-width (separation curve preparation step)

The separation curves 32 and 33 are prepared through operation processing using the initial values of the peaks 32$a$ and 33$a$ and the initial half-widths, which are determined through the aforementioned steps (A) and (B). The separation curves 32 and 33 are of Gaussian type, and a combination curve of the curves 32 and 33 is similar to a curve prepared on the basis of the measured data.

When the separation curves are prepared, the initial values of the heights of the peaks 32$a$ and 33$a$ of the separation curves 32 and 33 are determined, and the determined initial height values may also be employed for operation processing. The initial height value may be determined to be 50–70% of the height (X-ray intensity) of the rocking curve 31 of the initial peak thereof.

In the method, the peaks 32$a$ and 33$a$ of the separation curves 32 and 33 prepared through the steps (A) to (C) may be employed in a manner similar to the case of the local maximum points 22 and 23 of the aforementioned rocking curve 21 to evaluate a profile in relation to inclination of crystal planes in the surface of the magnetic film on the basis of the number and the shape of the peaks.

EXAMPLES

Effects of the present invention will next be described by way of specific examples, which are not intended to limit the scope of the present invention, and should not be so construed. Unless indicated otherwise herein, all parts, percents, ratios and the like are by weight.

The magnetic recording medium shown in FIG. 1 was produced as follows.

Test Example 1

An aluminum-alloy substrate 1 (diameter: 95 mm, thickness: 0.8 mm), on which an NiP film (thickness: 10 $\mu$m) had been formed through plating, was placed in a chamber of a DC magnetron sputtering apparatus (model: 3010, product of ANELVA CORPORATION).

Subsequently, the chamber was evacuated to $2\times10^{-7}$ Torr, and the substrate 1 was heated to 200° C. Thereafter, on the substrate 1, a undercoat film 2 (thickness: 100 Å) containing Ru, a non-magnetic intermediate film 3 (thickness: 50 Å) containing Co-35 at % Cr (Co35Cr), and a perpendicular magnetic film 4 (thickness: 500 Å) containing Co—22 at % Cr—10 at % Pt-2at % Ta (Co22Cr10Pt2Ta) were successively formed through sputtering.

On the perpendicular magnetic film 4, a carbon protective film 5 having a thickness of 70 Å was formed through plasma CVD.

On the protective film 5, a perfluoroether lubrication film having a thickness of 20 Å was formed through dipping.

Test Example 2

The procedure of Test Example 1 was repeated, except that the undercoat film 2 was formed from Co5Zr4Nb (thickness of the film 2: 2,500 Å) to produce a magnetic recording medium.

Test Example 3

The procedure of Test Example 1 was repeated, except that a second undercoat film (thickness: 100 Å) containing Ru was formed between the undercoat film 2 and the non-magnetic intermediate film 3 to produce a magnetic recording medium.

Test Example 4

The procedure of Test Example 1 was repeated, except that the undercoat film 2 was formed from Ge (thickness of the film 2: 100 Å) to produce a magnetic recording medium.

Test Example 5

The procedure of Test Example 1 was repeated, except that the undercoat film 2 was formed from Co8Zr12Nb (thickness of the film 2: 2,500 Å) to produce a magnetic recording medium.

Test Example 6

The procedure of Test Example 1 was repeated, except that the undercoat film 2 was formed from C (thickness of the film 2: 100 Å) to produce a magnetic recording medium.

For the magnetic recording medium of each Test Example, a rocking curve was prepared by use of a disk D during formation of the perpendicular magnetic film 4, through $\theta$–2$\theta$ scanning employing X-ray diffraction.

An incident angle $\theta$dif corresponding to the peak of the diffracted X-ray beam of a dominant crystal plane ((0002) plane) in the perpendicular magnetic film 4; an incident angle $\theta$ corresponding to the vertex or local maximum point of a peak portion of the rocking curve; and the difference between the incident angles ($\theta$–$\theta$dif) were obtained. The results are shown in Table 1.

Read-write conversion characteristics of the magnetic recording medium of each Test Example were measured by using a read/write analyzer RWA1632 and spin stand S1701MP (products of GUZIK). In order to evaluate read-write conversion characteristics, measurement was performed by using a complex-type thin film magnetic recording head as a magnetic head including a giant magnetoresistive (GMR) element at the reproduction portion, and track-recording density was set at 250 kFCI. Table 1 shows the results of measurement of read-write conversion characteristics (medium SNR at 200 kFCI).

Figure 10:
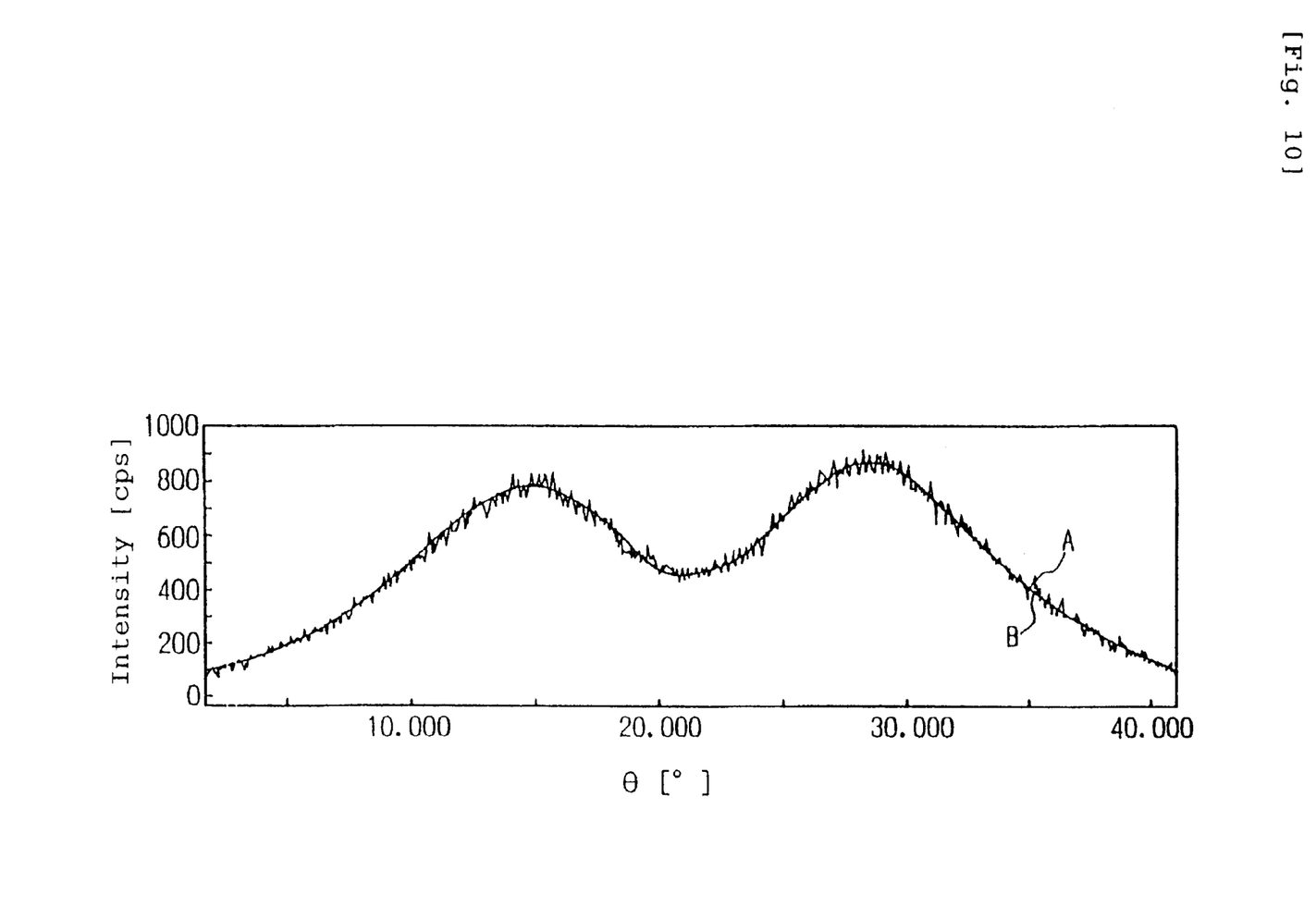
FIG. 10 is a graph showing test results.
Figure 11:
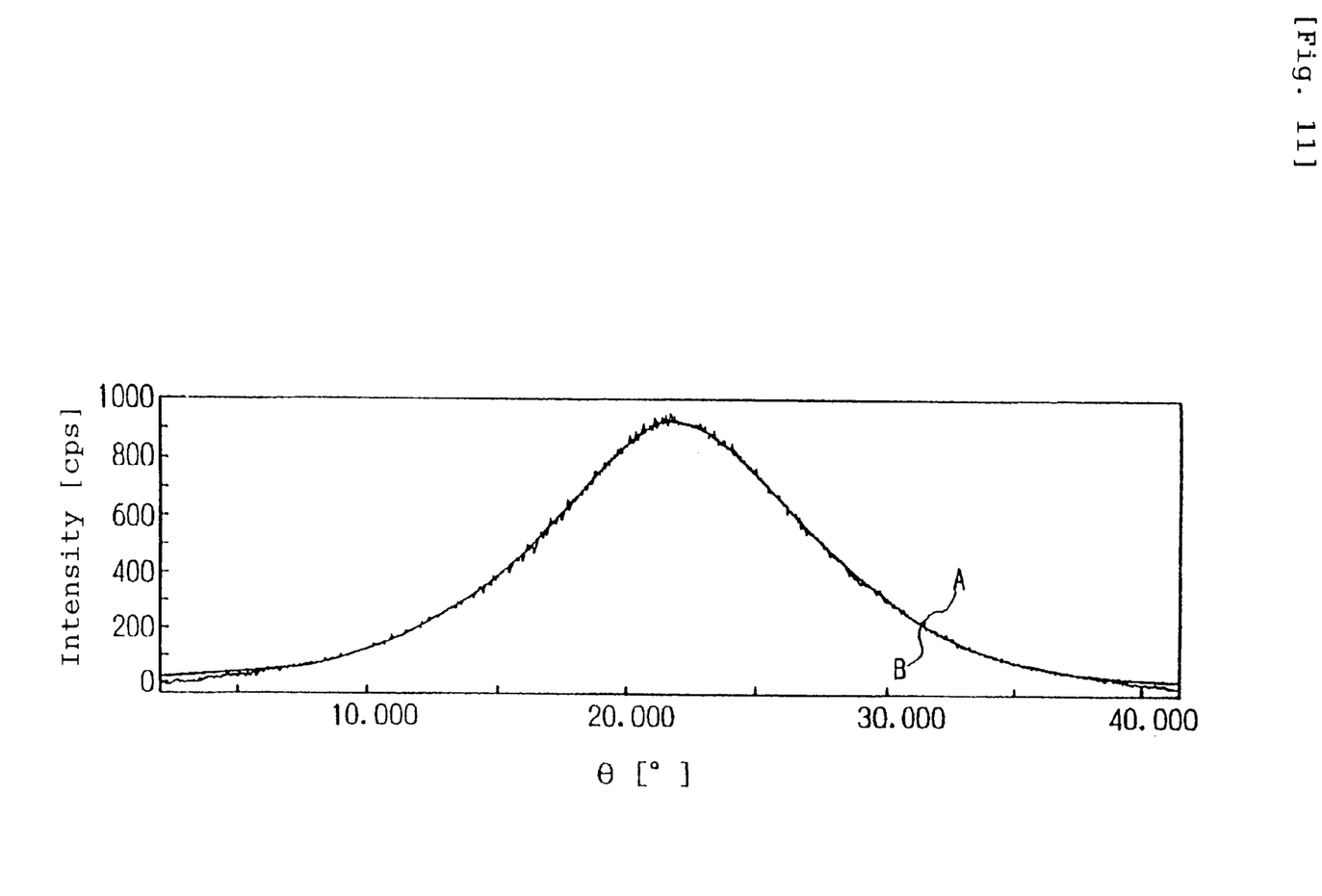
FIG. 11 is another graph showing test results.

FIG. 10 shows a rocking curve in relation to the magnetic recording medium of Test Example 2. FIG. 11 shows a rocking curve in relation to the magnetic recording medium of Test Example 5. These figures show measured data A and an approximate curve B prepared on the basis of the measured data by means of a weighted mean smoothing method.

TABLE 1

| | Composition of undercoat film | $\theta$dif (°) | Number of local maximum points | $\theta$ (°) | $\theta$–$\theta$dif (°) | Medium SNR (dB) |
|---|---|---|---|---|---|---|
| Test Ex. 1 | Ru | 21.7 | 2 | 13.1<br>30.3 | ±8.6 | 19.05 |
| Test Ex. 2 | Co5Zr4Nb | 21.7 | 2 | 14.8<br>28.4 | ±6.8 | 18.21 |
| Test Ex. 3 | Co5Zr4Nb<br>Ru (2nd undercoat film) | 21.7 | 2 | 14.5<br>28.9 | ±7.2 | 18.30 |
| Test Ex. 4 | Ge | 21.7 | 1 | 21.7 | 0 | 15.06 |
| Test Ex. 5 | Co8Zr12Nb | 21.7 | 1 | 21.7 | 0 | 15.03 |
| Test Ex. 6 | C | 21.7 | 2 | 19.7<br>23.7 | ±2.0 | 15.85 |

As is apparent from Table 1, the magnetic recording medium of Test Example 1, 2, or 3, in which the rocking curve has two local maximum points, exhibits excellent SNR, compared with the magnetic recording medium of Test Example 4 or 5, in which the rocking curve has only one local maximum point.

The results also revealed that the magnetic recording medium of Test Example 1, 2, or 3, in which the difference between $\theta$ and $\theta$dif falls within 3–10°, exhibits excellent noise characteristics compared with the magnetic recording medium of Test Example 6, in which the difference between $\theta$ and $\theta$dif falls outside the above range.

The results further revealed that the magnetic recording medium of Test Example 3, in which the second undercoat film 26 is formed between the undercoat film 2 and the non-magnetic intermediate film 3, exhibits excellent noise characteristics.

As described above, in relation to the perpendicular magnetic film of the magnetic recording medium of the present invention, a rocking curve obtained through $\theta$–2$\theta$ scanning employing X-ray diffraction has a plurality of local maximum points, and thus noise characteristics of the medium can be enhanced.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a (1) substrate; (2) an undercoat film; and (3) a perpendicular magnetic film in which most of the easy-magnetization axes are oriented vertically with respect to the substrate in order, wherein a rocking curve being obtained through $\theta$–2$\theta$ scanning employing X-ray diffraction in relation to the magnetic film has a plurality of local maximum points.

2. A magnetic recording medium to claim 1, wherein the rocking curve has two local maximum points and wherein a difference between an incident angle ($\theta$) of an incident X-ray beam corresponding to either of the two local maximum points and an incident angle ($\theta$dif) corresponding to a peak of a diffracted X-ray beam of a dominant crystal plane in the surface of the perpendicular magnetic film is 3–10°.

3. A magnetic recording medium according to claim 1 or 2, wherein a half width (p) of a peak portion of the rocking curve is 10–30°.

4. A magnetic recording medium according to claim 1 or 2, wherein the perpendicular magnetic film comprises an alloy selected from the group consisting of a Co/Cr alloy, a Co/Cr/Pt alloy, a Co/Cr/Ta alloy, and a Co/Cr/Pt/X alloy; wherein X is one or more species selected from the group consisting of Ta, Zr, Cu, Re, Nb, Si, Ge, and B.

5. A process for producing a magnetic recording medium, comprising successively forming on a substrate an undercoat film and a perpendicular magnetic film in which most of the easy-magnetization axes are oriented vertically with respect to the substrate so that a rocking curve obtained through $\theta$–$2\theta$ scanning employing X-ray diffraction has a plurality of local maximum points.

6. A magnetic recording and reproducing apparatus comprising a magnetic recording medium as recited in claim 1 or 2, and a magnetic head for recording data onto the magnetic recording medium and reproducing the data therefrom.

* * * * *